2,975,208
Patented Mar. 14, 1961

2,975,208

POLY-NITRATE ESTERS AND SALTS THEREOF

Gordon S. Myers, St. Laurent, Quebec, and Stanley O. Winthrop, Montreal, Quebec, Canada, assignors to American Home Products Corporation, New York, N.Y., a corporation of Delaware No Drawing. Filed June 18, 1959, Ser. No. 821,118

5 Claims. (Cl. 260—467)

This invention relates to poly-nitrate esters, and more particularly to nitrate esters of a propanediol, having coronary vasodilator activity.

Coronary vasodilators in present day use are water-insoluble nitrate esters of polyhydric alcohols, for example, nitroglycerine, pentaerythritol tetranitrate or mannitol hexanitrate. Although those substances have proved themselves as valuable therapeutic agents, they are characterized by an extremely low degree of solubility in water and other body fluids. It is the object of this invention to provide pharmacologically active poly-nitrate esters possessing an amino group which enables them to form water-soluble salts.

The compounds of the invention relate to bases having the general formula

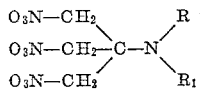

and stable, pharmacologically acceptable acid-addition salts thereof, preferably salts of mineral acids. In the above formula R and $R_1$ are intended to represent either hydrogen or an alkyl radical having 1 to 12 carbon atoms.

The bases may be designated as 2-amino-2-nitroxymethyl-1,3-propanediol dinitrates. Salts of these bases are easily formed in known manner with mineral acids as, for example, the hydrohalide acids, sulfuric acid or phosphoric acid.

The following examples illustrate the preparation of typical compounds of the invention, it being understood that these examples are merely illustrative and not limitative of the invention.

EXAMPLE 1

*Preparation of 2-amino-2-nitroxymethyl-1,3-propanediol dinitrate HCl*

To a flask containing 100 ml. of glacial acetic acid was added, simultaneously and equivalently, with stirring, a solution of 301 g. of 2-amino-2-hydroxymethyl-1,3-propanediol in 1500 ml. of glacial acetic acid, 835 g. of 90% nitric acid and 1600 ml. of acetic anhydride. The temperature during the addition was maintained at 9–13° C. with a cooling bath. After the addition was complete, the reaction mixture was stirred for 15 minutes in an ice-bath, and then drowned in ice-water mixture. The resulting mixture was made alkaline and the oily 2-amino-2-nitroxy-methyl-1,3-propanedinitrate which separated was removed by extraction with chloroform. The chloroform extract was washed with water, dried with anhydrous sodium sulphate and treated at 15° C. with a solution of 250 g. of dry hydrogen chloride in 1800 ml. of ether, to give a precipitate of white crystalline 2-amino-2-nitroxymethyl-1,3-propanediol dinitrate hydrochloride. This material, on recrystallization from acetone-ether, melted at 127° C. with decomposition.

Calcd. for $C_4H_8N_4O_9 \cdot HCl$: Cl, 12.1%. Found: Cl, 12.2%.

The acute toxicity ($LD_{50}$) of this compound, tested orally in mice, is 1000–1100 mg./kg.

EXAMPLE 2

*Preparation of 2-dimethylamino-2-nitroxymethyl-1,3-propanediol dinitrate HCl*

To a cold solution of 36 g. of 90% nitric acid in 330 ml. of acetic anhydride was added simultaneously and equivalently 138 g. of 90% nitric acid and a solution of 77.9 g. of 2-dimethylamino-2-hydroxymethyl-1,3-propanediol. The temperature during the addition was maintained at 8–11° C. with an ice-bath. The reaction mixture was stirred for 1 hour after the addition was complete and then it was drowned in ice-water mixture. This mixture was adjusted to pH 10 with sodium carbonate and extracted with chloroform. The chloroform extract was washed with water, dried with sodium sulphate and then treated with an ethereal solution of hydrogen chloride to give a white crystalline 2-dimethylamino-2-nitroxymethyl-1,3-propanediol dinitrate hydrochloride, M.P. 106° C. with decomposition.

*Analysis.*—Calcd. for $C_6H_{12}N_4O_9 \cdot HCl$: C, 22.5% H, 4.08% Cl, 11.06%. Found: C, 22.9% H, 4.16% Cl, 11.17%.

EXAMPLE 3

*Preparation of 2-monododecylamino-2-nitroxymethyl-1,3-propanediol dinitrate hydrochloride*

A mixture of 26.6 g. of trishydroxymethyl aminomethane, 49.8 g. of dodecylbromide and 50 ml. of ethanol was heated in a sealed tube to 110° C. for 15 hours. The reaction mixture was digested with 1500 ml. of hot acetone and filtered. Treatment of the acetone filtrate with gaseous hydrogen bromide gave 42 g. of crude crystalline 2 - monododecylamino - 2 - hydroxymethyl-1,3-propanediol hydrobromide. This hydrobromide was dissolved in 800 ml. of water, the free base was liberated by addition of ammonium hydroxide and then extracted into ether to give 30 g. of white flakes, M.P. 96–98° C. This was recrystallized from 1500 ml. of hot benzene to give 29 g. of 2-monododecylamino-2-hydroxymethyl-1,3-propanediol, M.P. 96–97° C.

*Analysis.*—Calcd. for $C_{16}H_{35}NO_3$: C, 66.4% H, 12.2% N, 4.84%. Found: C, 65.7% H, 11.7% N, 4.82%.

To a solution of 28.4 g. of 2-monododecylamino-2-hydroxymethyl-1,3-propanediol in 105 ml. of acetic acid, was added, simultaneously and equivalently, 29 g. of 90% nitric acid and 50 ml. of acetic anhydride, over a period of 20 minutes. The temperature during the addition was maintained with cooling at 10° C. After the addition was complete, the reaction mixture was stirred a further period of 1 hour at 0° C. and then drowned in ice-water mixture. The resulting slurry was adjusted to pH 10 with sodium carbonate and then extracted with chloroform. The chloroform extract was washed with water, dried with sodium sulphate and treated with an ethereal solution of hydrogen chloride to give a crystalline 2-monododecylamino - 2 - nitroxymethyl-1,3-propanediol dinitrate hydrochloride, M.P. 83° C. This material, on recrystallization from acetone-hexane, melted at 84–85° C.

*Analysis.*—Calcd. for $C_{16}H_{32}N_4O_9 \cdot HCl$: C, 41.7% H, 7.23%. Found: C, 42.1% H, 7.03%.

The salts of the invention are not only water-soluble but when used therapeutically as coronary vasodilators show a surprisingly long duration of action and are particularly useful as oral medicaments, for example in the form of tablets or capsules. These may be prepared in well-known manner, with the usual carrier or excipient vehicles.

We claim:
1. A therapeutic compound selected from the group consisting of a 2-amino-2-nitroxymethyl-1,3-propanediol dinitrate and pharmacologically acceptable mineral acid-addition salts thereof, said amino compound having the general formula

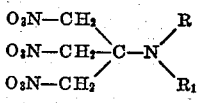

wherein R and $R_1$ each stands for a member of the group consisting of hydrogen and an alkyl of 1 to 12 carbon atoms.

2. As a new compound, a non-toxic mineral acid-addition salt of 2-amino-2-nitroxymethyl-1,3-propanediol dinitrate.

3. As a new compound, a non-toxic mineral acid-addition salt of 2-dimethylamino-2-nitroxymethyl-1,3-propanediol dinitrate.

4. As a new compound, a non-toxic mineral acid-addition salt of 2-monododecylamino-2-nitroxymethyl-1,3-propanediol dinitrate.

5. A therapeutic composition having vasodilator activity comprising a pharmacologically acceptable mineral acid-addition salt of a 2-amino-2-nitroxymethyl-1,3-propanediol dinitrate combined with a carrier.

No references cited.